US012604258B2

(12) United States Patent
Pérez Hernández et al.

(10) Patent No.: US 12,604,258 B2
(45) Date of Patent: Apr. 14, 2026

(54) METHOD AND SYSTEM FOR IDENTIFYING Wi-Fi DEVICES

(71) Applicant: GALGUS GLOBAL S.R.L., Valencia (ES)

(72) Inventors: Abraham Pérez Hernández, Valencia (ES); Pablo Aguilera Bonet, Valencia (ES); Jesús Fernández Manzano, Valencia (ES); José Ayub González Garrido, Valencia (ES); José Antonio Delgado Alonso, Valencia (ES)

(73) Assignee: GALGUS GLOBAL S.R.L., Valencia (ES)

( * ) Notice: Subject to any disclaimer, the term of this patent is extended or adjusted under 35 U.S.C. 154(b) by 298 days.

(21) Appl. No.: 18/687,559

(22) PCT Filed: Jul. 18, 2022

(86) PCT No.: PCT/EP2022/070020
§ 371 (c)(1),
(2) Date: Feb. 28, 2024

(87) PCT Pub. No.: WO2023/241815
PCT Pub. Date: Dec. 21, 2023

(65) Prior Publication Data
US 2024/0381234 A1 Nov. 14, 2024

(30) Foreign Application Priority Data
Jun. 17, 2022 (ES) ............................... ES202230540

(51) Int. Cl.
*H04W 48/16* (2009.01)
*H04W 24/08* (2009.01)
*H04W 84/12* (2009.01)

(52) U.S. Cl.
CPC ........... *H04W 48/16* (2013.01); *H04W 24/08* (2013.01); *H04W 84/12* (2013.01)

(58) Field of Classification Search
CPC ....... H04W 48/16; H04W 84/12; H04W 4/80; H04W 12/71; H04W 12/79; H04W 12/062; H04W 16/18; H04W 8/005; H04W 24/08
See application file for complete search history.

(56) References Cited

U.S. PATENT DOCUMENTS

2022/0167123 A1* 5/2022 Aguilera Bonet ...........................
G06F 18/23213

FOREIGN PATENT DOCUMENTS

WO WO-2012099541 A1 * 7/2012 ............. H04L 63/08
WO 2021104657 A1 6/2021
WO 2022029415 A1 2/2022

OTHER PUBLICATIONS

International Search Report and Written Opinion for Corresponding International Application No. PCT/EP2022/070020, Feb. 1, 2023, 9 pages.

* cited by examiner

*Primary Examiner* — Thai Nguyen
(74) *Attorney, Agent, or Firm* — LUCAS & MERCANTI, LLP

(57) ABSTRACT

A method and system for identifying Wi-Fi devices, the system (200) having a plurality N of access points (AP$_1$, AP$_2$, . . . , AP$_N$) arranged at an installation (204) and a server (210). The access points are configured to receive probe request frames (104) sent by Wi-Fi devices (202); generate a fingerprint (108) associated to each probe request frame (104); and send the generated fingerprint (108), a timestamp (502) and an RSSI measurement (508) associated to each probe request frame (104) to a server (210) that has a (Continued)

processing unit (220) to identify bursts (114) of probe request frames using their associated timestamps (502); for each burst i (114), determine an averaged RSSI measurement (118) received by each access point; for each fingerprint (108), perform an N-dimensional cluster analysis on the averaged RSSI measurements (118), obtaining at least one cluster (122) per fingerprint (108); and identify a Wi-Fi device for each different cluster (122).

10 Claims, 11 Drawing Sheets

600

| Timestamp $\sim$502 | Fingerprint $\sim$108 | MAC address $\sim$504 | RSSI AP$_1$ $\sim$118 | ... | RSSI AP$_N$ $\sim$118 |
|---|---|---|---|---|---|
| 602 → Time 1 | Fing 1 | MAC 1 | $x_{1,1}$ | ... | $x_{1,n}$ |
| 602 → Time 2 | Fing 2 | MAC 2 | $x_{2,1}$ | ... | $x_{2,n}$ |
| ... | ... | ... | ... | ... | ... |
| 602 → Time M | Fing F | MAC K | $x_{m,1}$ | ... | $x_{m,n}$ |

FIG. 6

METHOD AND SYSTEM FOR IDENTIFYING Wi-Fi DEVICES

CROSS-REFERENCE TO RELATED APPLICATIONS

This application is a 371 of PCT/EP2022/070020, filed Jul. 18, 2022, which claims the benefit of priority of Spanish Patent Application No. P202230540, filed Jun. 17, 2022, each of which are incorporated herein by reference

FIELD OF THE INVENTION

The present disclosure relates to wireless communication systems, and more particularly to methods and systems for identifying Wi-Fi devices (such as smartphones, tablets and laptops) when they are not connected to a Wi-Fi network.

BACKGROUND OF THE INVENTION

Wi-Fi, based on the IEEE 802.11 standard, is one of the most pervasive technologies in today's society. There are more than 14 billion Wi-Fi devices in the world, and this trend is only increasing. It is therefore very interesting to use WiFi technology for much more than just communicating over the Internet. Indeed, in recent years there has been a great deal of interest in the industry in the possibility of performing analytics such as passive device counting, segmentation according to visiting patterns, location, tracking, density heat maps, etc.

Wi-Fi devices broadcast wireless signals with a certain cadence that can be captured by nearby access points (APs). The access points listen to these signals and report the RSSI (Received Signal Strength Indicator), which indicates the received power. These signals, in the form of management frames called "Probe Request", are used by devices (smartphones, tablets, laptops, etc.) to discover new Wi-Fi networks nearby, as well as to search for those they already know. In these messages, devices announce their capabilities, what they expect to find on nearby networks, the speeds they support, etc. In addition, the probe request frames include an identifier of the sending device, the source MAC address.

A Wi-Fi analytics system could gather the probe requests using the access point's radios, and then build interesting statistics with this accurate data (e.g. device identification for counting or tracking). Unfortunately, there are several problems that cause conventional WiFi analytics systems to have very low accuracies and significant distortion in the data, rendering the metrics that are built with them useless. The two fundamental problems are:

Each device, depending on numerous variables, broadcasts frames at a different cadence, and with a different burst pattern. Among these uncontrolled variables are the manufacturer and model of the device, the operating system version, the remaining battery, how close it is to an access point, whether it is in use or not, whether the screen is off or not, and so on. Some devices simply do not emit any signal and are therefore invisible to the system. Fortunately, most modern smartphones emit a signal in the order of seconds or minutes, even when not in use. Therefore, this problem has a low impact, as it simply affects the temporal granularity of the analytics, which should be consistent with the system's ability to obtain fresh information from the devices around it.

It is well known that, for some years now, modern devices have been falsifying their source MAC address, precisely to confuse Wi-Fi analytics systems so that they are unable to count, track, etc. More than 90% of modern smartphones, tablets and laptops exhibit this behaviour. Wi-Fi devices randomly change their unique identifier, yielding their identification much more difficult. This phenomenon is known as MAC randomization and has a critical impact on the analytics that can be done with Wi-Fi. Faced with this problem, most Wi-Fi analytics vendors choose to do one of two tricks:

They perform analytics only on the small percentage of devices that do not randomise their MAC address. These devices are usually old and therefore not representative of the current corpus of commercial devices. A system that uses this trick is throwing away the vast majority of information (for instance, it could be counting 5 devices when there are actually 90).

They do analytics on all MAC addresses, regardless of whether they are random or not. As many devices are continuously changing their MAC, this is even worse, since it could be counting 1200 devices when there are actually 90.

It is clear that neither of these two options provides robust and reliable data against the MAC randomization problem. And this behaviour will only increase in the coming years until devices with static (real) MACs disappear. There is a need for a technology capable of building stable and robust identifiers of the devices around it, as MAC addresses are no longer reliable for applications such as counting, location, tracking, segmentation, etc.

Patent document WO2021104657-A1 tries to solve this problem, by performing a cluster analysis on a time series of the sequence numbers included in the header of the probe request frames. The invention described in this patent document works fine when the sequence numbers of the probe request frames are sequentially used by the Wi-Fi devices (e.g. sequence numbers: 256, 257, 258, etc.). However, many Wi-Fi devices are currently sending random sequence numbers (e.g. sequence numbers: 256, 122, 3, etc.), and for these Wi-Fi devices the cluster analysis of WO2021104657-A1 document would not properly work.

The present invention solves this problem, by unambiguously identifying Wi-Fi devices that are not connected to a Wi-Fi network and employ MAC address randomization, even when they use random sequence numbers in their probe request frames.

DESCRIPTION OF THE INVENTION

The present invention relates to a method and system for identifying Wi-Fi devices that solves the aforementioned problems.

The method comprises receiving, by a plurality N of access points arranged at an installation, probe request frames sent by Wi-Fi devices; generating, by the plurality N of access points, a fingerprint associated to each probe request frame; sending, from the plurality N of access points to a server, the generated fingerprint, a timestamp and an RSSI measurement associated to each probe request frame; identifying, by the server, bursts of probe request frames using their associated timestamps; for each burst of probe request frames, determining an averaged RSSI measurement received by each access point; for each fingerprint, performing an N-dimensional cluster analysis on the averaged RSSI measurements received by each access point, obtaining at least one cluster per fingerprint; and identifying a Wi-Fi device for each different cluster.

According to an embodiment, the cluster analysis includes computing the maximum distance in the N-dimensional RSSI space of two points of any cluster to obtain a spread scoring; and if the spread scoring is higher that a clustering threshold, incrementing the number of clusters by one. The clustering threshold is preferably a value trained using training probe requests frames received by the plurality N of access points, wherein the training probe request frames contain real MAC addresses of Wi-Fi devices.

In an embodiment, the cluster analysis is performed on the averaged RSSI measurements received by each access point within a determined time window. The temporal span of the time window is preferably trained using training probe requests frames received by the plurality N of access points, wherein the training probe requests frames contain real MAC addresses of Wi-Fi devices.

The system for identifying Wi-Fi devices comprises a plurality N of access points arranged at an installation and a server. The access points are configured to receive probe request frames sent by Wi-Fi devices; generate a fingerprint associated to each probe request frame; and send the generated fingerprint, a timestamp and an RSSI measurement associated to each probe request frame to a server. The server comprises a memory and a processing unit configured to identify bursts of probe request frames using their associated timestamps; for each burst of probe request frames, determine an averaged RSSI measurement received by each access point; for each fingerprint, perform an N-dimensional cluster analysis on the averaged RSSI measurements received by each access point, obtaining at least one cluster per fingerprint; and identify a Wi-Fi device for each different cluster.

BRIEF DESCRIPTION OF THE DRAWINGS

A series of drawings which aid in better understanding the invention and which are expressly related with an embodiment of the said invention, presented as a non-limiting example thereof, are very briefly described below.

FIG. 6 shows a table resulting from the burst identification and burst binding.

DESCRIPTION OF A PREFERRED EMBODIMENT OF THE INVENTION

The present invention refers to a method and system for identifying Wi-Fi devices. The present invention presents a novel solution to the problem of identifying non-associated WiFi devices that randomise their MAC address.

Figure 1:
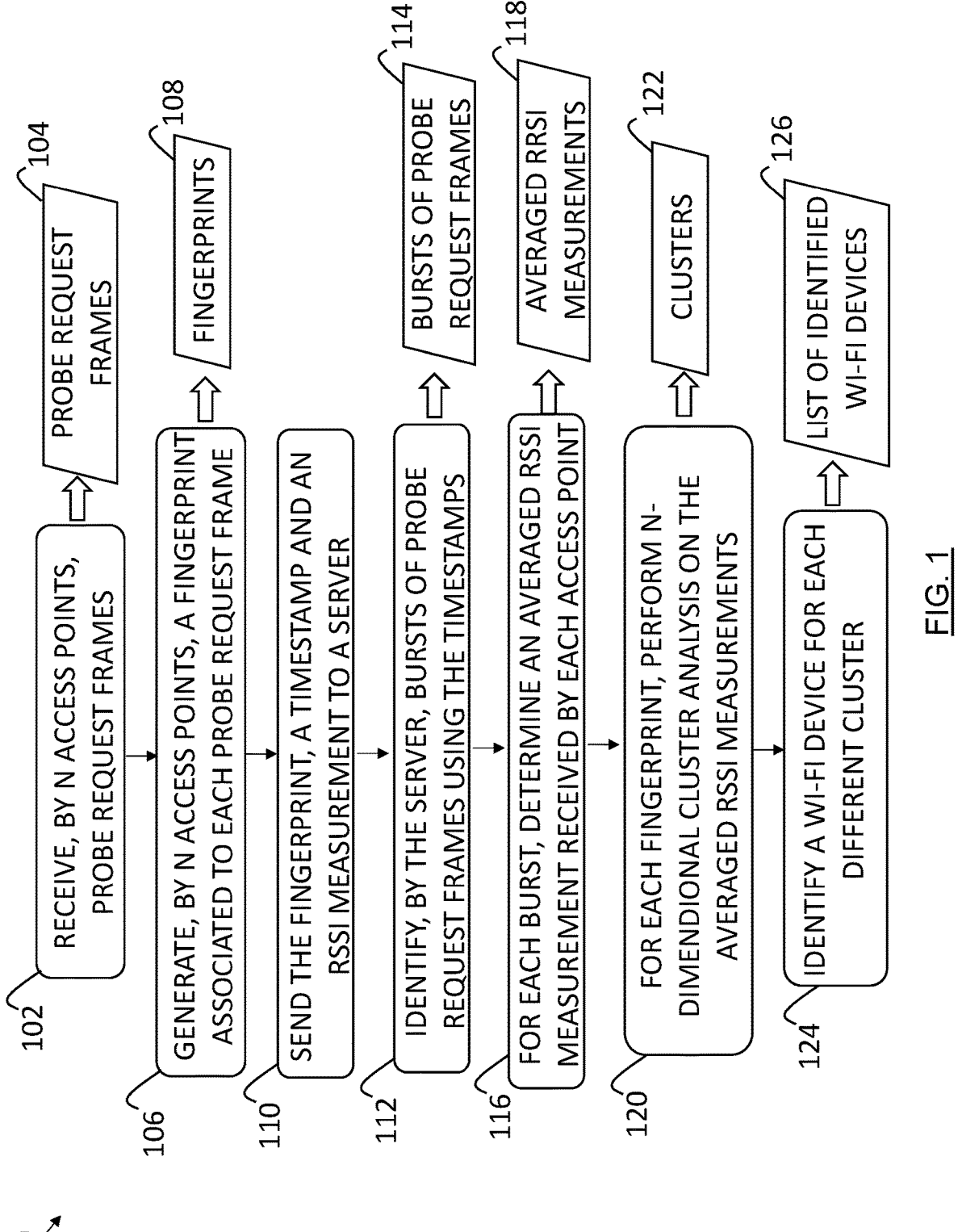
FIG. 1 represents a flow diagram of the method of identifying Wi-Fi devices according to an embodiment.

FIG. 1 depicts a flow diagram of a method 100 of identifying Wi-Fi devices according to an embodiment. The method 100 comprises receiving 102, by a plurality N of access points, probe request frames 104 sent by Wi-Fi devices. The Wi-Fi devices are not associated with the access points and, therefore, their identity is unknown since the devices normally use random MAC addresses.

For each probe request frame 104 received at an access point, the access point generates 106 an associated fingerprint 108. The fingerprint generation comprises extracting a set of features from a plurality of fields of each probe request frame 104 and assigning a fingerprint 108 to each probe request frame 104 based on the extracted set of features.

The plurality N of access points then send 110 the generated fingerprints 108 to a server. For each fingerprint 108, the access points also send a timestamp and an RSSI (Received Signal Strength Indicator) measurement corresponding to the probe request frame 104 to which the fingerprint 108 is associated.

The server identifies 112 bursts 114 of probe request frames using their associated timestamps. For each burst of probe request frames, the server determines 116 an averaged RSSI measurement 118 received by each access point. For each fingerprint, the server performs an N-dimensional cluster analysis 120 on the averaged RSSI measurements received by each access point, obtaining at least one cluster 122 per fingerprint 108. Finally, the server identifies 124 a Wi-Fi device for each different cluster 122, obtaining a list of identified Wi-Fi devices 126.

Figure 2:
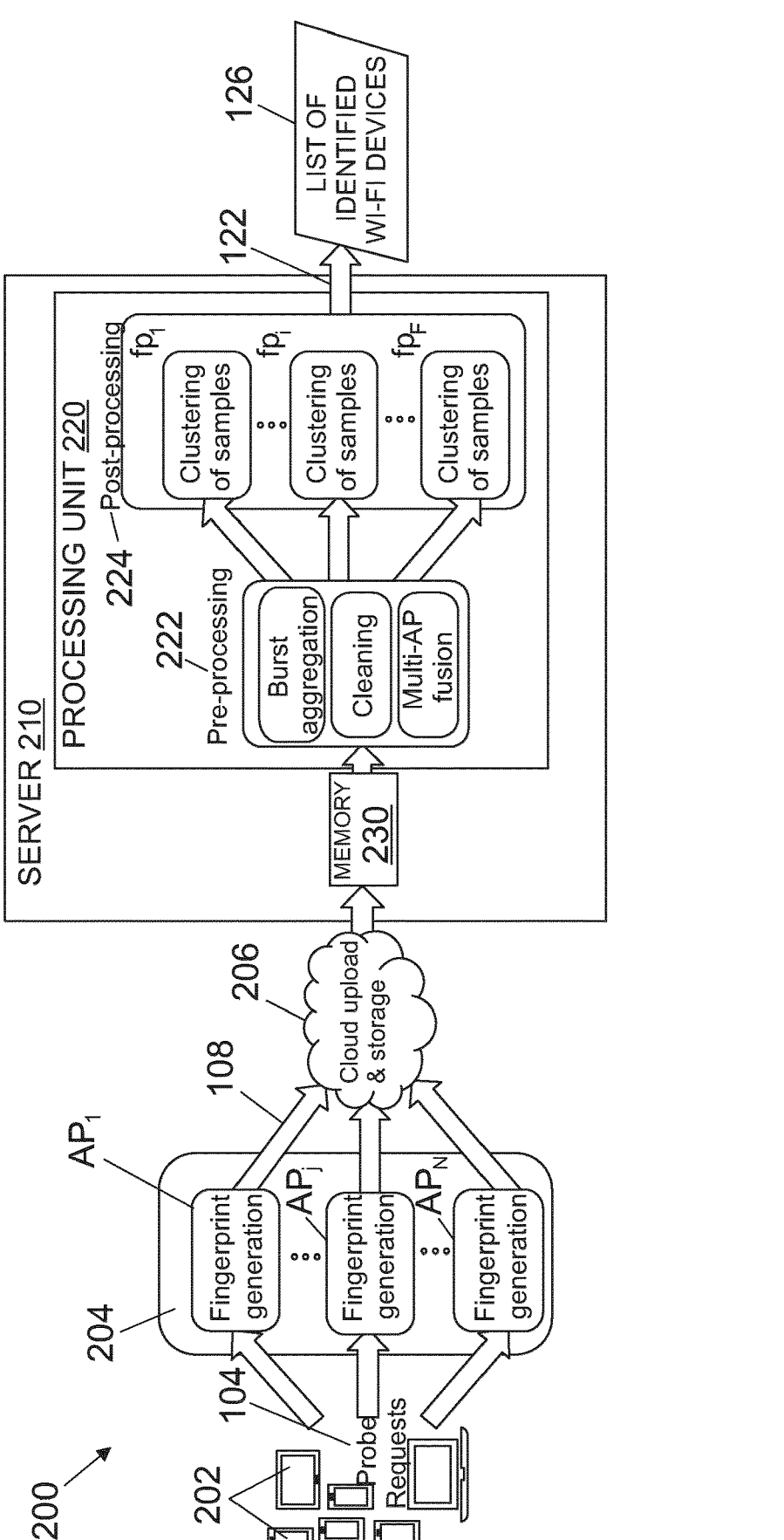
FIG. 2 represents a block diagram of a system for identifying Wi-Fi devices according to an embodiment.

FIG. 2 shows a block diagram of a system 200 for identifying Wi-Fi devices according to an embodiment. The system 200 comprises a plurality N of access points (AP$_1$, AP$_2$, . . . , AP$_N$) arranged at an installation 204 (e.g. a shopping centre, a school, a beach) and a server 210.

The system can be divided into two fundamental stages:

Fingerprint generation: The fingerprint is like a snapshot of the device's characteristics, created from the capabilities of the listened Probe Request (PR) frame. Several devices with exactly the same capabilities would exhibit the same fingerprint. This processing is done locally on each access point.

For those fingerprints suspected of masking multiple devices with exactly the same characteristics, blind (unsupervised) post-processing 224 is done to separate them in the RSSI space. A pre-processing step 222 is first performed to aggregate and clean this data in the server 210. This technique is not applied on single frames, but on groups of frames, forming clusters in an N-dimensional space, where N is the number of access points (AP$_1$, AP$_2$, . . . , AP$_N$) listening to those frames. The identification performed by the system usually improves as N grows (up to a limit).

With regard to the fingerprint generation, the access points (AP$_1$, AP$_2$, . . . , AP$_N$) are configured to receive probe request frames 104 sent by Wi-Fi devices 202 (also called "stations") and generate a fingerprint 108 associated to each probe request frame 104. Each access point locally generates a compact fingerprint from all the possible information present on each received probe request frame 104. It works for non-associated Wi-Fi devices 202 (with and without random MAC addresses), but its utility as a unique identifier of the Wi-Fi device 202 becomes more important when the MAC address is no longer reliable (i.e. when the MAC address is randomized).

The fingerprint 108 is generated by hashing specific information within the probe request frame 104. In an embodiment, a hashing algorithm having a reduced size and high entropy (ability to compress data) is preferably used. The access points gather probe request frames 104, extract their information elements (IEs) and make a footprint of those elements. Different hashing algorithms and methods for generating fingerprints may be used, such as the one disclosed in patent document WO2021104657-A1.

From all of the information elements present in a probe request frame 104, not all of them are used, but only those that are invariant for the same device. The information elements that can vary may be used, but only partially: it is only checked if they are present, but not their value. All this information is concatenated and passed through a hashing algorithm that returns the final fingerprint. Fingerprints in the 5 GHz band are preferred, because they are richer, but the same process may be done for fingerprints in the 2.4 GHz band (with fewer information elements).

In an embodiment, the information elements used are the following:

Supported rates.

Extended supported rates.

High Throughput (HT) capabilities.

Very High Throughput (VHT) capabilities. It was observed that some fields of this information element vary between two consecutive probe requests from the same device. To avoid noise in the fingerprint, the following fields may be discarded: Modulation Coding Scheme (MCS) supported maps, Beamformee Space-Time Stream (STS) capabilities, and Number of sounding dimensions.

HE capabilities.

Extended capabilities.

The information elements whose content can vary but can be partially used are:

Direct-sequence (DS) parameter set.

Fast Initial Link Setup (FILS) request parameters.

Interworking.

Multi Band Operation (MBO).

As a final information, it is checked whether the OUI (Organizationally Unique Identifier, the first three bytes of a MAC address) of the MAC address is a known fixed random prefix, like Google's da:a1:19. However, the vast majority of current MAC addresses randomise 46 of the 48 bits that constitute the MAC address. In an embodiment, the applied hashing algorithm is a 64 bit Fowler/Noll/Vo FNV-1a, which provides great balance between simplicity, portability, speed, low collisions and good distribution.

Figure 3:
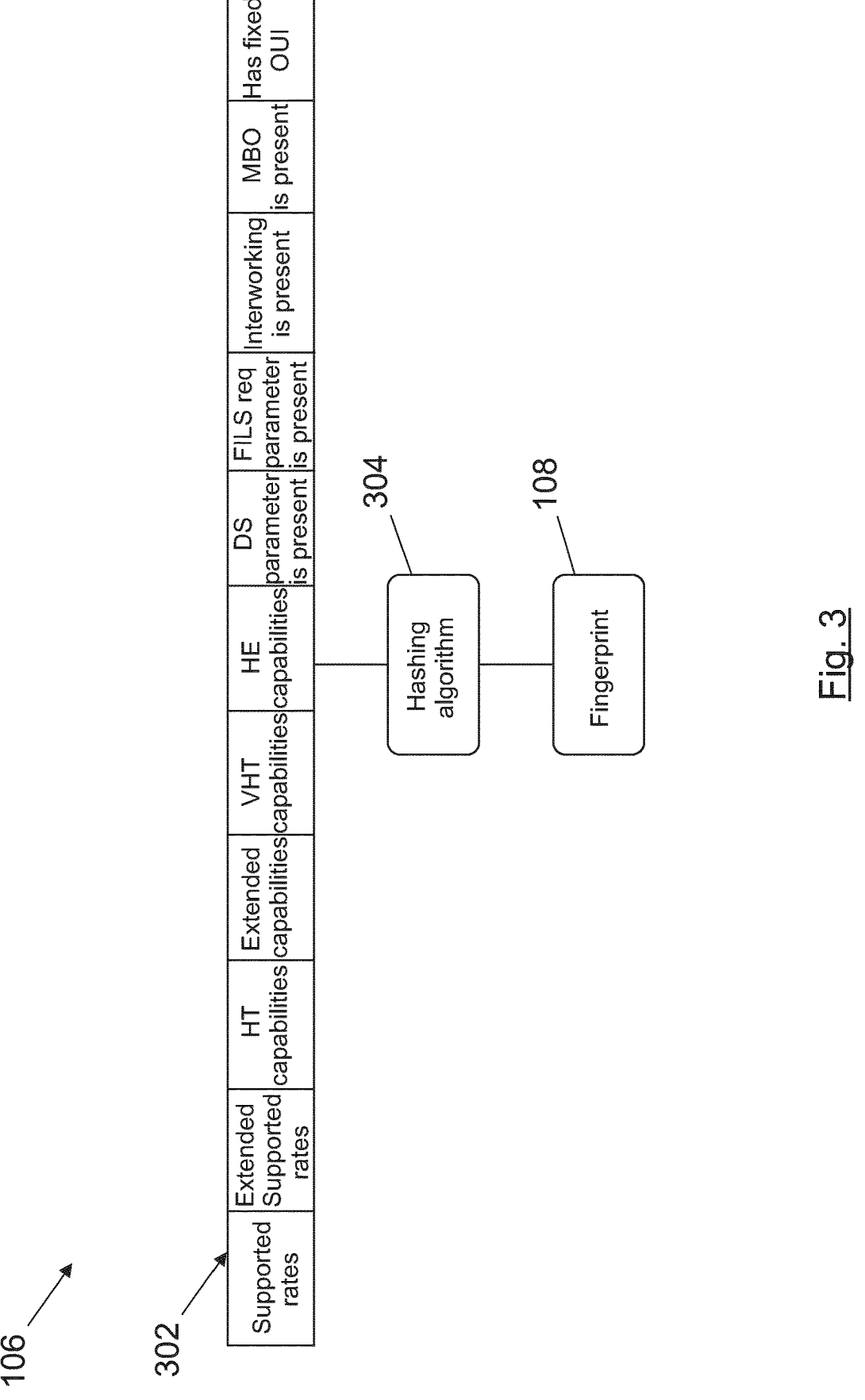
FIG. 3 depicts a fingerprint generation using a hashing algorithm.

FIG. 3 depicts, according to an embodiment, the fingerprint generation 106 using a hashing algorithm 304 on each access point. The input of the hashing algorithm 304 is a set of information elements 302 of the probe request frames 104 received at the access points. The output of the hashing algorithm 304 is a fingerprint 108 that condense and clean the information gathered on each probe request. As previously explained, other different fingerprint generation methods may be employed.

The next step includes cloud upload and storage 206. This step consists of each access point uploading the fingerprints 108 to a cloud database (e.g. memory 230 at the server 210). The fingerprint uploading may be carried out in real time, as they are generated. The access points also upload some additional metadata, such as a timestamp or an RSSI (Received Signal Strength Indicator) measurement of the corresponding probe request frame 104. This data is stored in a table as they arrive at the server 210. The rows of the table are sorted according to the timestamp.

The next step, preprocessing, is performed at a processing unit 220 of the server 210. The goal of the preprocessing is to have multiple quasi-simultaneous RSSI readings for each received fingerprint, to identify which probe request frames 104 have been received by different access points, so that the RSSIs can be grouped and treated in the next stages. To achieve this goal, two main steps are performed: burst identification and burst binding.

A burst is a group of probe request frames 104 sent by a Wi-Fi device 202 in a very short period (in the order of milliseconds), to achieve redundancy. In this period, the MAC address is consistent. The number of probe request frames sent per burst by a Wi-Fi device 202 and the span of time between consecutive bursts depend on each Wi-Fi device 202 and its circumstances: battery level, OS version, driver version, etc.

Figure 4:
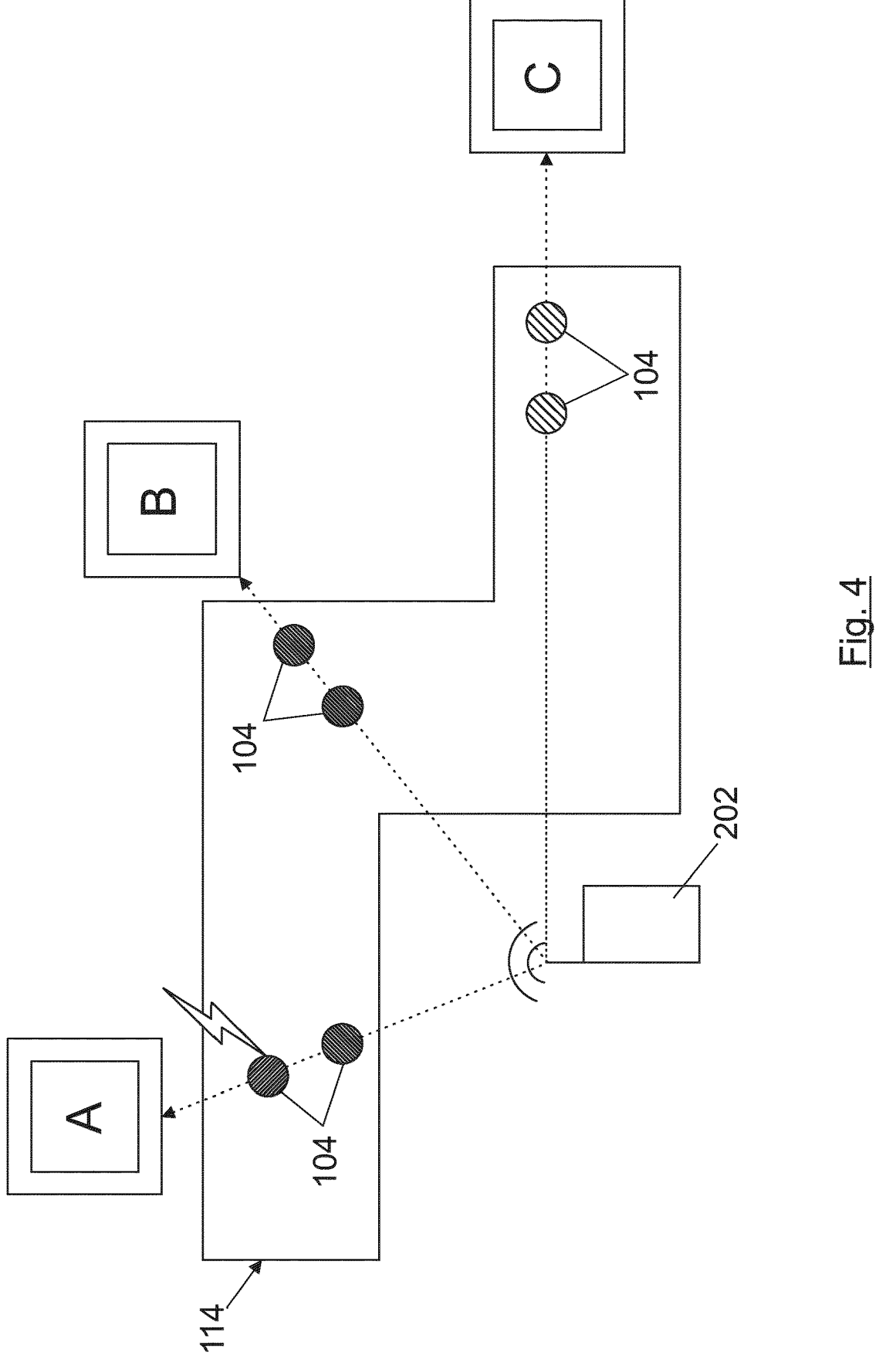
FIG. 4 depicts a burst of probe request frames between a Wi-Fi device and three different access points, wherein some of the probe request frames of the burst are lost.

In real scenarios, it is a common event that some frames of the burst are lost while others reach the access point, due to possible interference, multi-pathing, or collisions. This is shown in the scheme depicted in FIG. 4: a Wi-Fi device 202 sends two probe request frames 104 in every channel (i.e. a burst 114 of probe request frames), and different possible results might occur. For access point A, one of the probe request frames 104 suffer a collision (highlighted with a lightning symbol) and it gets lost, while the other probe request frame 104 is received. For access point B, both probe request frames 104 are received correctly, but in the case of access point C, both probe request frames 104 are lost due to the distance between access point C and the Wi-Fi device 202. Therefore, only access point B has received the first probe request frame. If a one-to-one probe request association was made, the record would imply that the Wi-Fi device 202 is far from access point A and access point C, as none of them received the first frame, but this would a wrong assumption. Therefore, a solution is to aggregate the received probe request frames 104 for each access point and each burst 114.

This way, the first step in the pre-processing includes identifying the different received bursts 114 for each access point. This can be made, for instance, by locating the frames with the same MAC address received by the same access point in the last second (or other configurable span of time), as no Wi-Fi device 202 sends multiple bursts in that short interval of time. These probe request frames 104 are grouped and their RSSI measurements and timestamps are averaged. This step is called burst identification.

Figure 5:
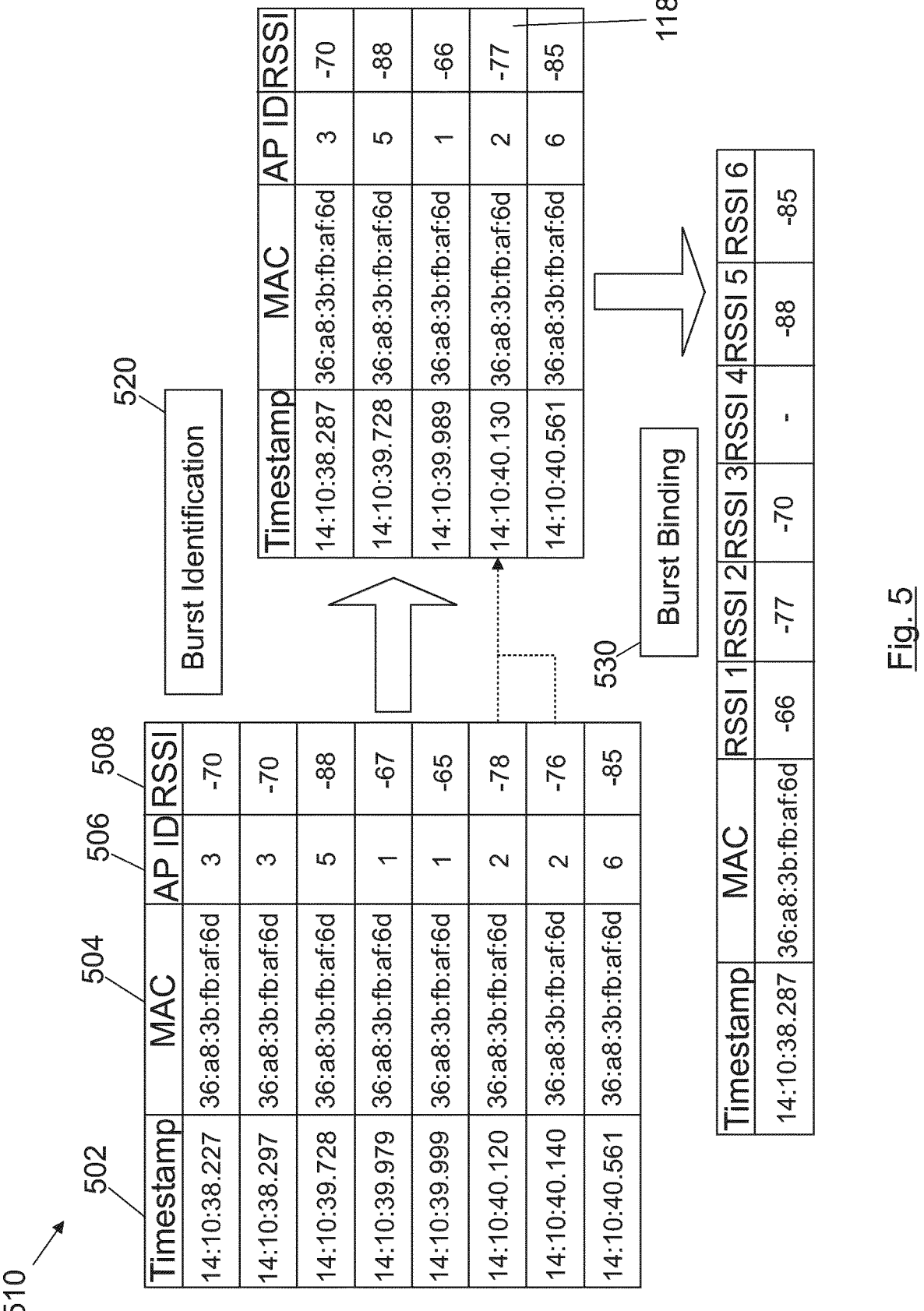
FIG. 5 shows an example of burst identification.

FIG. 5 depicts an exemplary embodiment of burst identification 520. The processing unit 220 of the server 210 receives several fingerprints associated to probe request frames in a short time, including an associated timestamp 502, a MAC address 504, an access point identifier 506 (i.e. the access point which sent this data to the server 210) and an RSSI measurement 508 of the corresponding probe request frame. This data is stored in a table 510, wherein each row corresponds to a different fingerprint (the fingerprint is not shown in the columns). The probe request frames are grouped for each access point, and the RSSI measurements and timestamps are averaged. For instance, for access point 2 there are two probe request frames received within 20 miliseconds, a time interval shorter than 1 second, and the RSSID measurements 508 (−78 and −76 dBm) are averaged to −77 dBm (averaged RSSI measurement 118) and the timestamps 502 (14:10:40.120 and 14:10:40.140) are averaged as well (14:10:40.130).

After that, burst binding 530 is carried out, where the averaged RSSI measurements 118 of the bursts received in different access points are compared, looking for cases where in an interval of few seconds a burst with the same MAC address is received in different access points. As the temporal span is small, it is supposed that it is the same group of probe request frames (i.e. burst 114) received by different access points, and the measurements are grouped in a table for a proper analysis in the next stage. For instance, in FIG. 5 all the averaged RSSID measurements 118 corresponding to a same burst 114 are associated and joint together in a single row of a table. In this example, the first (i.e. older) timestamp is used for the burst 114 and the RSSI measurement corresponding to access point 4 is kept empty, since no measurement was received by this access point.

Finally, an optional step of filtering the grouped bursts can be carried out, dropping every burst whose maximum captured RSSI is below some determined clustering threshold, in the order of −80 dBm. The aim of this cleaning is to ensure that the user identification will be performed in an area close to the access points, within the installation 204 where the access points are arranged.

The resulting data structure of the pre-processing step 222 is represented in the table 600 depicted in FIG. 6, wherein each row represents a different identified burst (aggregated burst 602). In the table 600, N represents the number of access points in the group, M is the number of captured bursts 114, K is the number of unique MAC addresses 504, and F is the final number of unique fingerprints 108. The expected relation between these numbers is that M is greater than or equal to K, which in turn is also greater than or equal to F. They will be equal only if each captured burst comes from totally different devices, hence their fingerprint will be different too. In the table 600, $x_{ij}$ represents the averaged RSSI measurement of the burst i received by the access point $AP_j$, but if no probe request frame 104 of that burst 114 is captured by an access point, then $x_{i,j}$ is fixed to the minimum RSSI acquired in a real scenario, which is usually in the order of −90 dBm.

The purpose of the post-processing step 224 performed by the processing unit 220 is to identify which of the obtained fingerprints (fp$_1$, fp$_2$, . . . , fp$_F$) is actually masking multiple devices and to separate their probe request frames in order to acquire statistics and analytics for device counting or device tracking. The post-processing is carried out on the aggregated bursts 602 in a time window basis.

The temporal span of the time window is a variable design that will depend on the expected number of users. In an embodiment, the default value of the time window is set out to five minutes. The aggregated bursts 602 within each time window are split depending on the MAC address, whether it is randomized or it is a real (static) one. If it is a real MAC, the measured RSSI can be directly employed on a location algorithm based on true-range multilateration. Therefore, analytics are trivial in that case.

Figure 7:
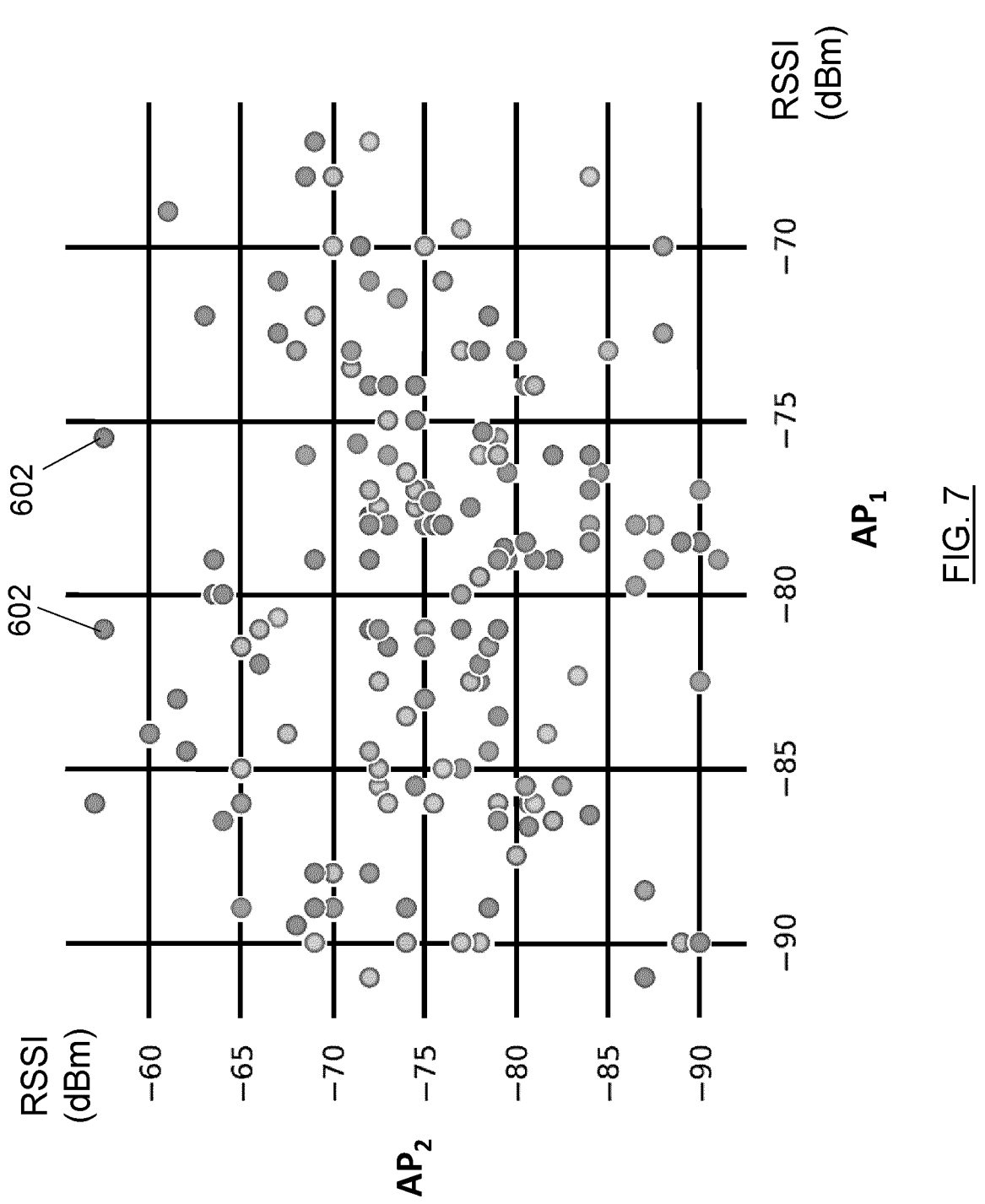
FIG. 7 depicts a scatter plot of aggregated bursts received by two access points.

However, most of modern devices randomize their MAC address so a deeper analysis needs to be implemented. FIG. 7 shows the scatter plot of aggregated bursts 602 received from probe request frames with random MAC address, as viewed by two access points (AP$_1$, AP$_2$) in the installation 204. Without the segmentation by fingerprints, it is hard to know how many devices have produced all these aggregated bursts 602.

In a next step, the aggregated bursts 602 are grouped by their fingerprints 108. Next, each group is examined and clustered (if needed) following the flowchart depicted in FIG. 8. For each fingerprint (fp$_1$, fp$_2$, . . . , fp$_F$), an N-dimensional cluster analysis is performed on the averaged RSSI measurements ($x_{i1}$, $x_{i2}$, . . . , $x_{iN}$) 118 received by each access point (AP$_1$, AP$_2$, . . . , AP$_N$), obtaining at least one cluster 122 per fingerprint 108. The output is a list of labels (list of identified Wi-Fi devices 126) identifying which aggregated bursts 602 correspond to the same Wi-Fi device 202 by studying the cadence, burst pattern, and the RSSI matrix.

Figures 9A, 9B:
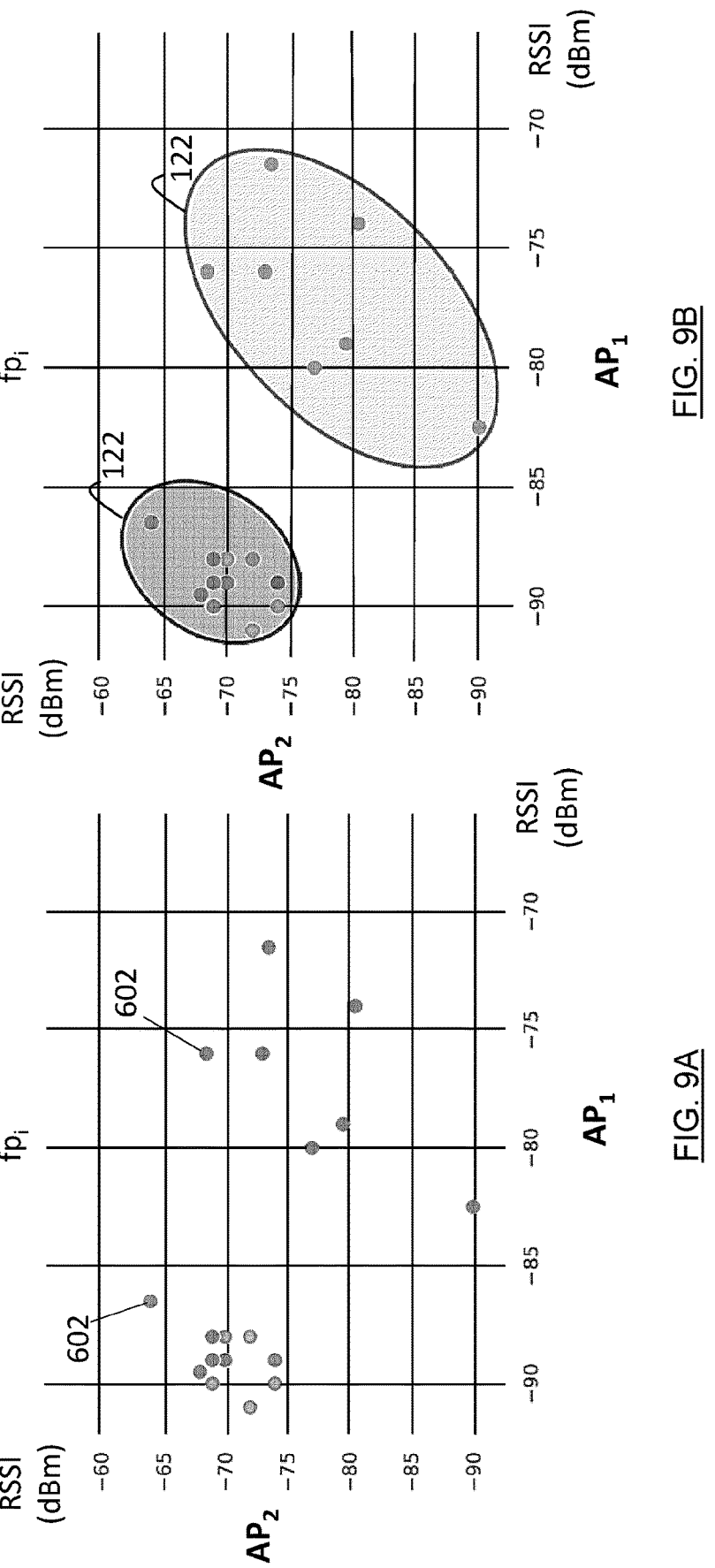
FIGS. 9A and 9B respectively show an example of an input and an output of the clustering process applied on an installation with two access points.

FIGS. 9A and 9B show an example of input (FIG. 9A) and output (FIG. 9B) of the clustering process applied to a fingerprint fp$_i$ for an installation 204 with two access points AP$_1$ and AP$_2$ (N=2). On FIG. 9A, the probe request scatter plot including the aggregated bursts 602 is received. At first glance it can be seen that there are two clear clusters of aggregated bursts 602, although in other cases (especially when N>2) it will not be obvious. On FIG. 9B the result of the unsupervised clustering process is shown, in which two different clusters 122 are identified and therefore it is determined that in this time window this same fingerprint fp$_i$ is masking two different Wi-Fi devices 202. A system that only counts one Wi-Fi device 202 per fingerprint 108 would be wrong in this case.

Figure 8:
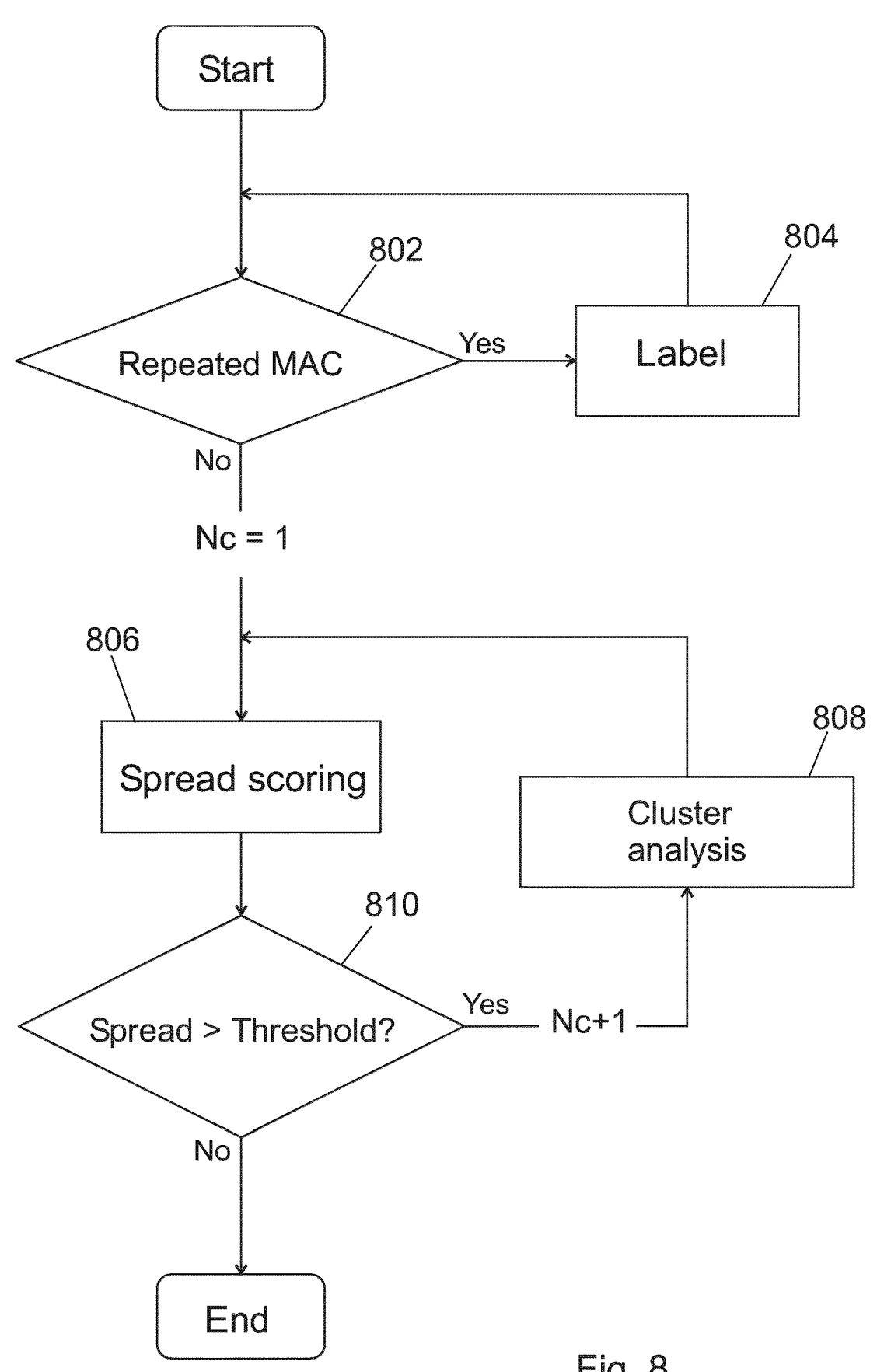
FIG. 8 shows a flow diagram of a cluster analysis performed on each fingerprint.

According to the embodiment of FIG. 8, the cluster process includes the following steps:

1. Iterate looking for MAC addresses which are repeated 802 many times within the time window. This will imply that the Wi-Fi device is a device with slow-rotation MAC address, and only the aggregated bursts 602 with that MAC address belong to that device. Therefore, only those aggregated bursts 602 are labeled 804 and the left ones continue the processing.

2. Unsupervised clustering is applied and it is checked if the resulting clusters are gathered enough. This is evaluated via a scoring metric that finds the maximum distance in the N-dimensional RSSI space of two points of any cluster. First, it is tested if only one cluster (i. e. Wi-Fi device) would be enough (number of clusters N$_C$=1). If a spread scoring 806 is higher that a clustering threshold, then the number of clusters N$_C$ is incremented by one and the clustering analysis 808 is carried out again. The loop stops when the resulting clusters of aggregated bursts 602 are concentrated enough, and so the aggregated bursts 602 are labeled.

For the cluster analysis 808 many clustering methods can be applied, such as a k-means analysis, which clusters data with the purpose of obtaining K groups of equal variance, minimizing the inertia, which is the sum of the squared distance from each point of a cluster to its centroid. It always converges but in order to achieve the global minimum, and not a local minimum, the initialization is key. Therefore, the computation of the clusters is carried out several times with different initial centroids. As an improvement of this implementation, k-means++ scheme was developed (Arthur et al., "K-means++: The Advantages of Careful Seeding", 2007), and it reduced the issues with the initialization process. K-means is a good choice for this application because the variance of the RSSI of the probe request frames is similar for pseudo-static devices in an area. When the devices are moving, the variance will grow, but as the analysis is done in a temporal basis, the time window can be shortened if the devices are supposed to be in motion. In scenarios where devices have disparate behaviour, hence different variances in RSSI of the probe request frames, other clustering methods can be used, such as a hierarchical clustering algorithm.

Figure 10:
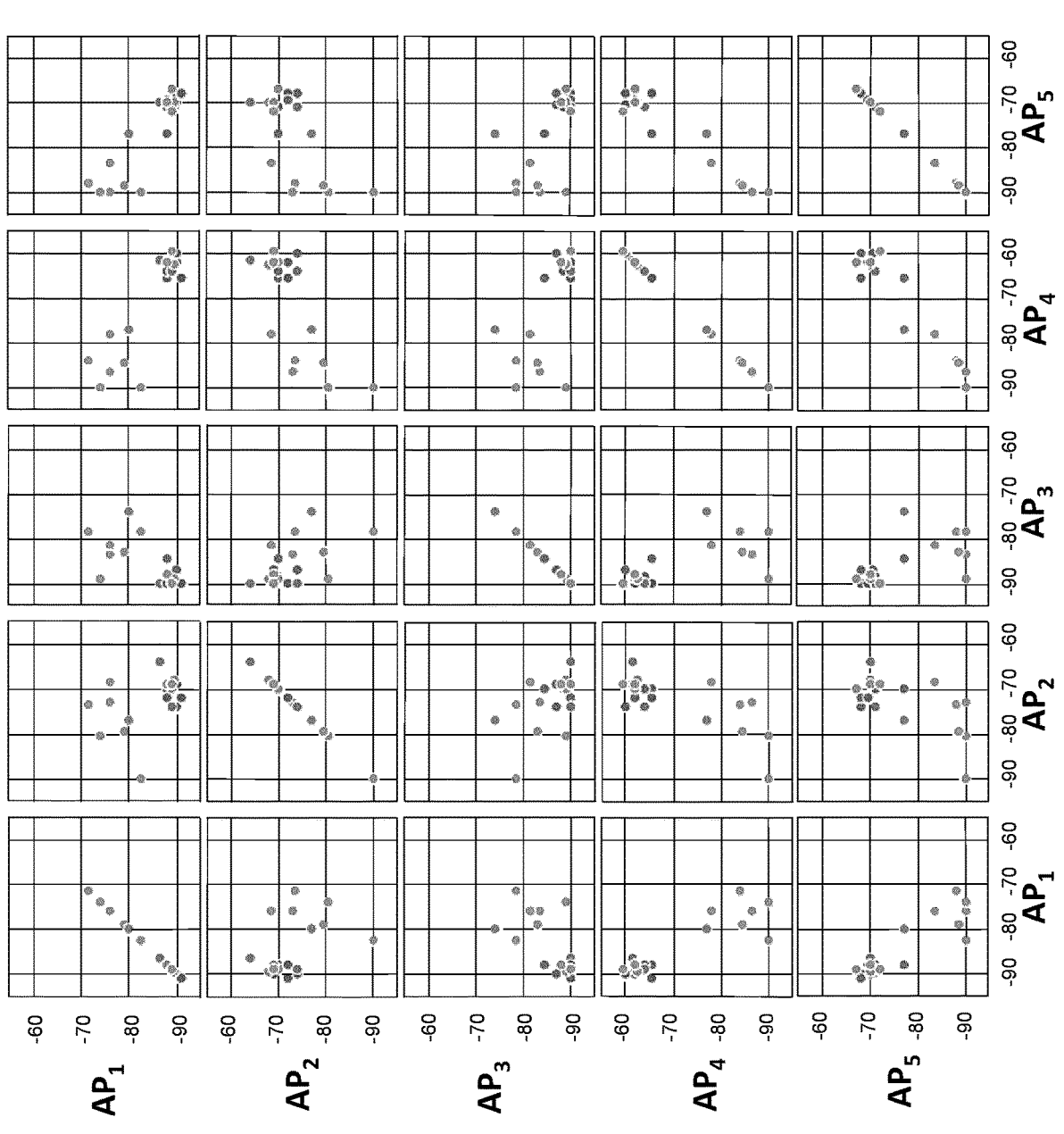
FIG. 10 shows an example of scatter plots of aggregated bursts as viewed by five different access points, wherein the scatter plots are grouped in pairs of access points.

FIG. 10 shows an example of scatter plots of aggregated bursts 602 as viewed by five different access points (AP₁, AP₂, AP₃, AP₄, AP₅) in the installation 204, grouped in pairs of access points. In this case N=5, and the cluster analysis 808 in 5D is performed directly working in the 5-dimensional space, without the need to do it using the 2D planes shown in the figure. FIG. 10 shows the resulting planes if the "5D point cloud" is projected on each plane formed by a pair of access points (AP₁-AP₂, AP₁-AP₃, etc), only for illustration.

The clustering is therefore performed directly in a N-dimensional space using the Kmeans++ algorithm with a determined clustering threshold, which is preferably trained from real data. The cluster analysis may include computing the maximum distance, in the N-dimensional RSSI space, of two points of any cluster, obtaining a spread scoring 806. It is then checked 810 whether the spread scoring 806 is higher that a clustering threshold, and in that case the number of clusters $N_C$ is incremented by one.

In an embodiment, the cluster analysis is performed on the averaged RSSI measurements 118 received by each access point (AP₁, AP₂, . . . , AP$_N$) within a determined time window.

The clustering threshold and/or the temporal span of the time window may be values trained using training probe requests frames received by the plurality N of access points (AP₁, AP₂, . . . , AP$_N$), wherein the training probe requests frames contain real MAC addresses of Wi-Fi devices 202.

To obtain the best results in the post-processing step 224, it is very important to tune the system parameters to match the characteristics of the scenario (expected number of devices, user patterns, mobility, etc.). It is evident that in a mall the expected number of Wi-Fi devices is higher than in a regular office; besides, the Wi-Fi devices will move more often in the first scenario than in the last one. The parameters that need to be calibrated are the temporal span of the time window and the clustering threshold for the maximum distance within one cluster. This adjustment can be conducted manually. However, the probe request frames from the real MAC Wi-Fi devices could be exploited in a training system that would find the optimal values, with the supposition that these real MAC Wi-Fi devices behave in a way similar to the randomized MAC Wi-Fi devices.

Figure 11:
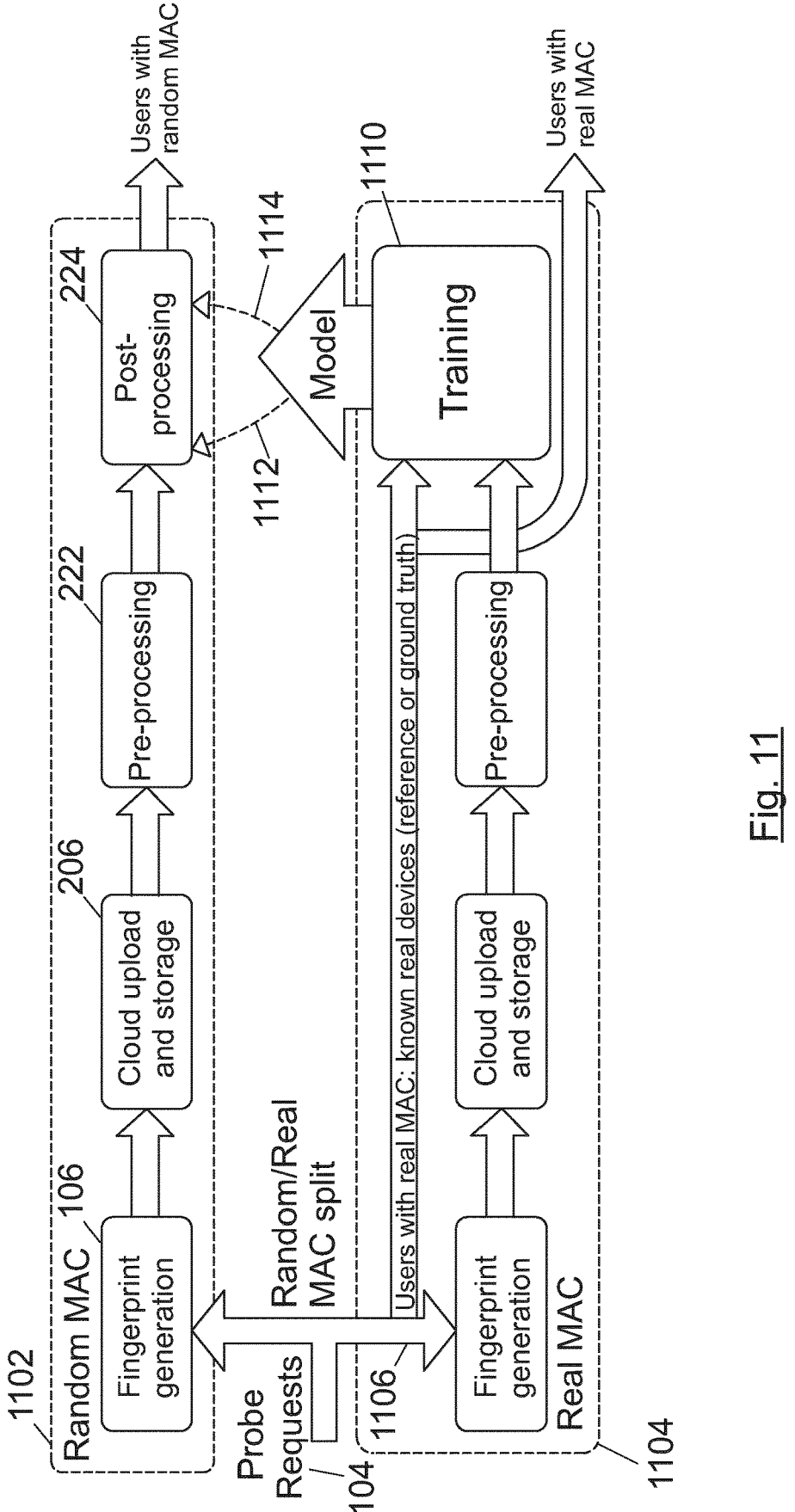
FIG. 11 represents, according to an embodiment, a training process to obtain a clustering threshold and/or a temporal span of the time window, parameters that are later used in the clustering analysis.

A training process according to an embodiment to obtain a clustering threshold and/or a temporal span of the time window is depicted in FIG. 11. According to this figure, the probe request frames 104 received with real MAC addresses and random MAC addresses follow different paths. The upper branch 1102 corresponds to the process already described in FIG. 2 for random MAC addresses (fingerprint generation 106, cloud upload and storage 206, pre-processing 222 and post-processing 224).

Probe request frames 104 with real MAC addresses (i.e. training probe request frames 1106) follow the lower branch 1104, and they are used for training at the server 210. Randomized MAC addresses and real MAC addresses are identified using the second less-significant bit of the first byte of the MAC address. In particular, if the second character in a MAC address is a 2, 6, A, or E, then it is a randomized MAC address; otherwise, the MAC address is a real MAC address. For instance, the MAC address 92:B1:B8:41:D1:85 is a randomized MAC address because the second character is a 2. In the lower branch 1104 the fingerprints are also calculated from training probe request frames 1106 that contain real MAC addresses of Wi-Fi devices, but the fingerprints are not needed to determine how many MAC addresses mask a single device since one real MAC corresponds to one Wi-Fi device. For the same reason, in this training process it is also not necessary to separate clusters within a fingerprint from probe request frames with real MAC addresses (the post-processing step 224 is not required). However, the processing of probe request frames with real MAC addresses allows to take advantage of the fact that the number of real devices is known, in order to calibrate some system parameters. Indeed, the training system can obtain an output and, knowing what the correct output should be, the system can adapt some values or parameters to match both results (output vs expected output).

This process is known as model training 1110, which is performed at the server 210, and the results are the estimated best values for the learned parameters, namely the temporal span 1112 of the time window (the time duration of the analysis window) and/or the clustering threshold 1114 (threshold for maximum distance within a single cluster, threshold of the maximum distance from which we consider that it is not only a single cluster, but two clusters). These values will be different in each scenario or installation 204. In other words, the values will not be the same for deployment in a shopping centre, a school, or a beach, for instance. With this training process, the system can constantly self-calibrate (although after some time of operation, these parameters shall remain stable).

According to an embodiment, the training process groups all the real-MAC aggregated bursts 602 by its MAC address using time windows with different temporal spans 1112 and finds the average spread scoring 806 of the aggregated bursts 602 of the same Wi-Fi device for each temporal span. The trained temporal span 1112 may be selected, for instance, according to the following process:

In a determined scenario or installation 204, capturing burst of frames with different time windows (with different temporal spans, e.g. 1 second, 5 seconds, 30 seconds) from the same device (i.e. the same real MAC address).

Obtaining the spread scoring for each time window. The spread scoring represents the dispersion of the fingerprint is in the scatter plot (the greater the spread scoring, the higher the dispersion).

Selecting the temporal span of the time window for which the spread scoring remains smallest or below a determined threshold. If the threshold is, for instance, 10 dBm, the two samples furthest from the scatter plot are not more than 10 dBm apart. The resulting temporal span is considered the most suitable for the scenario or installation 204 (office, school, beach, etc.), for which the users remain without moving too much during that time.

A similar process could be done for the clustering threshold. However, a different tuning process can be done using any training algorithm, from a simple regression (linear or non-linear) to a deep neural network.

The invention claimed is:

1. A method of identifying Wi-Fi devices, the method comprising:

receiving, by a plurality N of access points (AP₁, AP₂, . . . , AP$_N$) arranged at an installation, probe request frames sent by Wi-Fi devices;

generating, by the plurality N of access points (AP₁, AP₂, . . . , AP$_N$), a fingerprint associated to each probe request frame;

sending, from the plurality N of access points ($AP_1$, $AP_2$, . . . , $AP_N$) to a server, the generated fingerprint, a timestamp and a Received Signal Strength Indicator (RSSI) measurement associated to each probe request frame;

identifying, by the server, bursts of probe request frames using their associated timestamps;

for each burst i of probe request frames, determining an averaged RSSI measurement ($X_{i1}$, $X_{i2}$, . . . , $X_{iN}$) received by each access point ($AP_1$, $AP_2$, . . . , $AP_N$);

for each fingerprint, performing an N-dimensional cluster analysis on the averaged RSSI measurements ($X_{i1}$, $X_{i2}$, $X_{iN}$) received by each access point ($AP_1$, $AP_2$, . . . , $AP_N$), obtaining at least one cluster per fingerprint; and identifying a Wi-Fi device for each different cluster.

2. The method of claim 1, wherein the cluster analysis includes:

computing a maximum distance in the N-dimensional RSSI space of two points of any cluster to obtain a spread scoring; and if the spread scoring is higher that a clustering threshold, incrementing the number of clusters (Nc) by one.

3. The method of claim 2, wherein the clustering threshold is a value trained using training probe requests frames received by the plurality N of access points ($AP_1$, $AP_2$, . . . $AP_N$), wherein the training probe request frames contain real Medium Access Control (MAC) addresses of Wi-Fi devices.

4. The method of claim 1, wherein the cluster analysis is performed on the averaged RSSI measurements received by each access point ($AP_1$, $AP_2$, . . . , $AP_N$) within a determined time window.

5. The method of claim 4, wherein a temporal span of the time window is trained using training probe requests frames received by the plurality N of access points ($AP_1$, $AP_2$, . . . , $AP_N$), wherein the training probe requests frames contain real MAC addresses of Wi-Fi devices.

6. A system for identifying Wi-Fi devices, the system comprising:

a plurality N of access points ($AP_1$, $AP_2$, . . . , $AP_N$) arranged at an installation and configured to:

receive probe request frames sent by Wi-Fi devices;

generate a fingerprint associated to each probe request frame; and send the generated fingerprint, a timestamp and a Received Signal Strength Indicator (RSSI) measurement associated to each probe request frame to a server; and the server, comprising a memory and a processing unit configured to:

identify bursts of probe request frames using their associated timestamps;

for each burst i of probe request frames, determine an averaged RSSI measurement ($X_{i1}$, $X_{i2}$, $X_{iN}$) received by each access point ($AP_1$, $AP_2$, . . . , $AP_N$);

for each fingerprint, perform an N-dimensional cluster analysis on the averaged RSSI measurements ($X_{i1}$, $X_{i2}$, . . . , $X_{iN}$) received by each access point ($AP_1$, $AP_2$, . . . , $AP_N$), obtaining at least one cluster per fingerprint; and identify a Wi-Fi device for each different cluster.

7. The system of claim 6, wherein for the cluster analysis the processing unit is configured to:

compute a maximum distance in the N-dimensional RSSI space of two points of any cluster to obtain a spread scoring; and if the spread scoring is higher that a clustering threshold, increment the number of clusters (Nc) by one.

8. The system of claim 7, wherein the clustering threshold is a value trained using training probe requests frames received by the plurality N of access points ($AP_1$, $AP_2$, . . . , $AP_N$), wherein the training probe requests frames contain real MAC addresses of Wi-Fi devices.

9. The system of claim 6, wherein the processing unit is configured to perform the cluster analysis on the averaged RSSI measurements received by each access point ($AP_1$, $AP_2$, . . . , $AP_N$) within a determined time window.

10. The system of claim 9, wherein a temporal span of the time window is trained using training probe requests frames received by the plurality N of access points ($AP_1$, $AP_2$, . . . , $AP_N$), wherein the training probe requests frames contain real MAC addresses of Wi-Fi devices.

* * * * *